(12) United States Patent
Sakuragi et al.

(10) Patent No.: US 7,104,941 B2
(45) Date of Patent: Sep. 12, 2006

(54) TOOL POT

(75) Inventors: Satoshi Sakuragi, Aichi-ken (JP);
Toshihiro Goto, 6, Toei-cho 6-chome, Mizuho-ku, Nagoya, Aichi-ken (JP)

(73) Assignees: AQI Seiko Co., Ltd., Aichi-ken (JP); Toshihiro Goto, Aichi-ken (JP)

( * ) Notice: Subject to any disclaimer, the term of this patent is extended or adjusted under 35 U.S.C. 154(b) by 34 days.

(21) Appl. No.: 11/050,684

(22) Filed: Feb. 7, 2005

(65) Prior Publication Data

US 2005/0181919 A1    Aug. 18, 2005

(30) Foreign Application Priority Data

Feb. 12, 2004 (JP) .............................. 2004-034628

(51) Int. Cl.
*B23Q 3/157* (2006.01)

(52) U.S. Cl. ............................. 483/65; 483/68; 483/59; 483/902; 279/900; 279/22; 211/70.6; D15/140

(58) Field of Classification Search ............ 483/58–59, 483/65, 66–68, 902, 901; 279/900, 22, 23.1; 211/1.51–1.57, 70.6; D15/140
See application file for complete search history.

(56) References Cited

U.S. PATENT DOCUMENTS

| | | | | |
|---|---|---|---|---|
| 3,822,790 | A | * 7/1974 | Armour et al. | ............ 211/70.6 |
| D348,274 | S | 6/1994 | Hallbach et al. | |
| 5,688,215 | A | * 11/1997 | Mase et al. | .................. 483/66 |
| 6,083,146 | A | * 7/2000 | Earley, Jr. | .................. 483/59 |
| 6,155,961 | A | * 12/2000 | Pollington et al. | ............ 483/59 |
| 6,494,822 | B1 | * 12/2002 | Hopkins | ...................... 483/59 |
| 6,620,083 | B1 | 9/2003 | Ninomiya et al. | |

| | | | |
|---|---|---|---|
| 2005/0227841 | A1 * | 10/2005 | Hwang ........................ 483/59 |

FOREIGN PATENT DOCUMENTS

| | | |
|---|---|---|
| DE | 3716748 A1 * | 12/1988 |
| EP | 1 162 027 | 12/2001 |
| GB | 2149696 A * | 6/1985 |

(Continued)

OTHER PUBLICATIONS

Patent Abstracts of Japan vol. 2003, No. 12, Dec. 5, 2003 & JP 2003 275935 A (Okuma Corp), Sep. 30, 2003 *abstract*.

(Continued)

*Primary Examiner*—Erica Cadugan
(74) *Attorney, Agent, or Firm*—Armstrong, Kratz, Quintos, Hanson & Brooks, LLP

(57) ABSTRACT

A tool pot according to the present invention includes a synthetic resin portion made from thermo-plastic resin and arranged over an entire length from an opening end to a tool gripping portion. Inner surface of the synthetic resin portion is a tool attachment hole. The synthetic resin portion is provided in the vicinity of the opening end of the attachment hole with a supporting surface for supporting a tool. The synthetic resin portion includes an outer structure defining outer shape, an inner structure defining inner circumference of the tool attachment hole, a cavity provided between the outer structure and the inner structure, and joint ribs joining the outer structure and the inner structure. Each of the outer structure, the inner structure and the joint ribs has wall-thickness enough to secure rigidity of the synthetic resin portion and capable of suppressing mold shrinkage of the synthetic resin portion. The tool pot according to the present invention has rigidity without damaging tools by the synthetic resin portion, and has high dimensional accuracy and design freedom.

10 Claims, 16 Drawing Sheets

| | FOREIGN PATENT DOCUMENTS | | |
|---|---|---|---|
| JP | 4-35841 U | * | 3/1992 |
| JP | 9-248731 A | * | 9/1997 |
| JP | 2001-347434 | | 12/2001 |
| JP | 2002-137134 A | * | 5/2002 |
| JP | 2002-273633 | | 9/2002 |

OTHER PUBLICATIONS

Patent Abstracts of Japan vol. 009, No. 252 (M-420), Oct. 9, 1985 & JP 60 104626 A (Mori Tekkosho:KK), Jun. 10, 1985 *abstract*.

European Search Report of May 23, 2005.

* cited by examiner

TOOL POT

The present application claims priority from Japanese Patent Application No. 2004-034628 of Sakuragi et al., filed on Feb. 12, 2004, the disclosure of which is hereby incorporated into the present application by reference.

BACKGROUND OF THE INVENTION

1. Field of the Invention

The present invention relates to a tool pot used for a tool magazine of a machine tool, and more particularly, to a tool pot composed of a cylindrical synthetic resin portion over an entire length from an opening end to a tool gripping portion. The synthetic resin portion is made from thermo-plastic resin, and inner surface thereof is a tool attachment hole.

2. Description of the Related Art

In the prior art, Japanese Laid-Open Patent No. 2001-347434 discloses a tool pot composed of a cylindrical synthetic resin portion over an entire length from an opening end to a tool gripping portion. The synthetic resin portion is made from thermo-plastic resin, which is recyclable.

Inner surface of the synthetic resin portion serves as a tool attachment hole. A part of the inner surface of the attachment hole near an opening end is diverged toward the opening end and serves as a tapered supporting surface for holding tools.

The synthetic resin portion of the tool pot disclosed in above reference is injection molded from thermo-plastic resin material such as polyamide. The synthetic resin portion is provided on outer side thereof with reinforcing ribs for securing certain rigidity. If the ribs are thickened, rigidity of the synthetic resin portion is improved easily. However, thickening of the ribs may also cause mold shrinkage, and hinder the synthetic resin portion from attaining expected dimensional accuracy.

In order that the synthetic resin portion with reinforcing ribs secure rigidity and also avoid mold shrinkage, a great deal of effort has been made to design shape, size, or arrangement of the ribs. Consequently, there has not been so much freedom in design of the synthetic resin portion.

To improve rigidity while avoiding thickening of the ribs, it is conceivable to mix a great deal of reinforcing filler such as glass fiber into thermo-plastic resin material for the synthetic resin portion. If the thermo-plastic resin material itself is rigidified, however, inner surface of the tool attachment hole is rigidified, too, and may damage tools inserted into the hole if tools are dislocated from exact inserting position when inserted into the attachment hole. That is, hardening of the material itself cannot be an appropriate solution to the above problem.

In the synthetic resin portion of the tool pot, moreover, angle and inner diameter of the tapered supporting surface of the attachment hole, and length from the supporting surface to the tool gripping portion made of ball plungers or the like, which is located at the bottom of the tool attachment hole for gripping tools, requires dimensional accuracy.

SUMMARY OF THE INVENTION

The present invention contemplates to solve the above mentioned problems, and therefore, has an object to provide a tool pot having rigidity without damaging tools by the synthetic resin portion, and also having high dimensional accuracy and design freedom.

The tool pot according to the present invention includes a tool attachment hole into which a tool is inserted, and a tool gripping portion located in deeper side of the attachment hole. Inner surface of the attachment hole close to an opening end of the attachment hole is diverged toward the opening end and serves as a supporting surface for supporting a tool. The tool pot includes a cylindrical synthetic resin portion arranged over an entire length of the tool attachment hole from the opening end to the tool gripping portion, and made from thermo-plastic resin. The synthetic resin portion includes an outer structure defining outer shape, an inner structure defining inner circumference of the tool attachment hole, a cavity provided between the outer structure and the inner structure, and joint ribs joining the outer structure and the inner structure. Each of the outer structure, the inner structure and the joint ribs has wall-thickness enough to secure rigidity of the synthetic resin portion and capable of suppressing mold shrinkage of the synthetic resin portion.

In the tool pot of the present invention, the synthetic resin portion includes the outer structure, the inner structure and the joint ribs joining the outer and inner structures and, thus has a double wall structure of the outer structure and the inner structure. Accordingly, the synthetic resin portion retains rigidity by reciprocal reinforcement of the individual parts even if each of the outer and inner structures and the joint ribs is thin-walled.

Since the outer and inner structures and the joint ribs are thin-walled, mold shrinkage is suppressed, which helps heighten dimensional accuracy, and facilitates design changes such as in arrangement position or shape of the joint ribs or the like as well. That is, design freedom of the synthetic resin portion is heightened. Thick-walled portion is likely to cause mold shrinkage.

Moreover, damaging of tools by the synthetic resin portion is prevented, too, since rigidity of the synthetic resin portion is not retained by thermo-plastic resin material itself.

Therefore, the tool pot of the present invention has rigidity without damaging tools by the synthetic resin portion, and also has high dimensional accuracy and design freedom.

To suppress mold shrinkage, it is desired that upper limit of wall thickness of the outer and inner structures and the joint ribs is less than 4.0 mm, preferably 3.5 mm or less, and more preferably 3.0 mm or less. Lower limit is desirably, partially, 0.2 mm or more, or more preferably 1.0 mm or more for securing rigidity of the synthetic resin portion. Average of wall thickness is desirably within a range of 1.5 to 3.0 mm.

Thermo-plastic resin material is exemplified by ABS resin, polyacetal, polyamide, polystyrene, polycarbonate or the like.

In the tool pot of the present invention, the synthetic resin portion may be formed by connecting separately molded outer structure and inner structure at least either one of which is provided with joint ribs, by high frequency welding, vibration welding, adhesive or the like. It will also be appreciated to connect separately molded joint ribs and outer and inner structures, or to gas injection mold the outer structure, inner structure and the joint ribs integrally.

When the synthetic resin portion is manufactured by connecting the outer structure and inner structure, the tool pot can be arranged to accommodate variety of tools only by exchanging the inner structure, where dimensional accuracy of the tool attachment hole is required, while leaving the outer structure as it is. Therefore, the tool pot can handle various kinds of tools with simple exchanging work of the inner structure. In addition, by controlling wall-thickness of the inner structure, dimensional accuracy in angle and inner diameter of the supporting surface of the tool attachment hole, and in length from the supporting surface to the tool gripping portion, which is made of ball plungers or the like and located at the bottom of the hole for gripping tools, is secured. This helps ease management of dimensional accuracy of the outer structure, and facilitates manufacturing of the outer structure.

On the other hand, when the synthetic resin portion is gas injection molded, cost of the tool pot including cost of mold, and processes for manufacturing the tool pot is reduced in comparison with a case where each of the parts is separately injection molded.

When the synthetic resin portion is gas injection molded, if the tool pot is provided on outer circumference with grooves that expose the inner structure, and side walls of the grooves serve as the joint ribs joining the outer and inner structures, the joint ribs are arranged at predetermined positions accurately utilizing projected portions of a mold for forming the grooves.

In this case, it is desired that the grooves are arranged intermittently along circumference of the tool pot, in the vicinity of the supporting surface but away from the opening end part of the supporting surface.

With this construction, the outer structure is split in axial direction of the attachment hole at positions of the projections of the mold for forming the grooves, and the split parts are further suppressed from mold shrinkage. Then dimensional accuracy over an entire length of the outer structure is further heightened, which prevents dimensional inaccuracy from occurring in the inner structure. In addition, if grooves extending in circumferential direction are arranged proximate to the supporting surface, accuracy in angle and inner diameter of the supporting surface is heightened, too. Furthermore, since the circumferential grooves are arranged intermittently, portions of the cavity arranged axially of the attachment hole are so communicated in positions without the grooves as to admit gas for gas injection molding, and therefore, there is no hindrance in molding the synthetic resin portion.

Here, if the gas injection ports of the mold for gas injection molding are located in both sides relative to the circumferential grooves, the groove may be arranged all along the circumference of the tool pot. However, this construction is liable to complicate control of timing of injection of molten material and so on, and therefore, is not practical.

It will also be appreciated that, when the synthetic resin portion is gas injection molded, the synthetic resin portion includes more than one grooves extending in axial direction of the attachment hole. Since each of the axial grooves provides two joint ribs in a circumference of the hole, the synthetic resin portion comes to include more than 4 joint ribs lining up in the circumference of the attachment hole. Consequently, the outer structure and the inner structure are joined in numbers of positions, and rigidity of the outer and inner structures are secured.

If more than one grooves extending axially of the attachment hole are provided, number of the grooves is desirably two to four, since this way number of split molds for gas injection molding is reduced.

Moreover, it is desired that width of each of the grooves is within a range of 1.0 to 20.0 mm, so that a circumferential surface having generally ¼ size of the circumference of the outer structure is provided between each of the grooves. With this construction, when the driving of the chain as pot holding mechanism stops for exchanging tools, center of the tool pot as stopped may not conform with an exchange base position at first. Even in that case, if an arcuate positioning face of a positioning device is applied to the circumferential surface of the cylindrical outer structure in the tool pot, the tool pot is guided by the positioning face, and its center matches with the base position. Therefore, the tool pot with this construction is located in a predetermined stop position easily and accurately.

The same working-effect is obtained in a tool pot in which the synthetic resin portion is manufactured by connecting the outer and inner structures. In this type of tool pot, the synthetic resin portion has a circular cylindrical circumference all over an entire circumference of the tool attachment hole.

In this type of tool pot, moreover, the outer structure may consist of two split parts split in a parting face extending along axial direction of the tool attachment hole and having the same shapes, each of the split parts includes the joint ribs. With this construction, a cylindrical outer structure is manufactured of two pieces of the same split part, and this one kind of the split part is molded from a mold including two split molds. Consequently, cost and manufacturing processes of the outer structure is reduced.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 6:
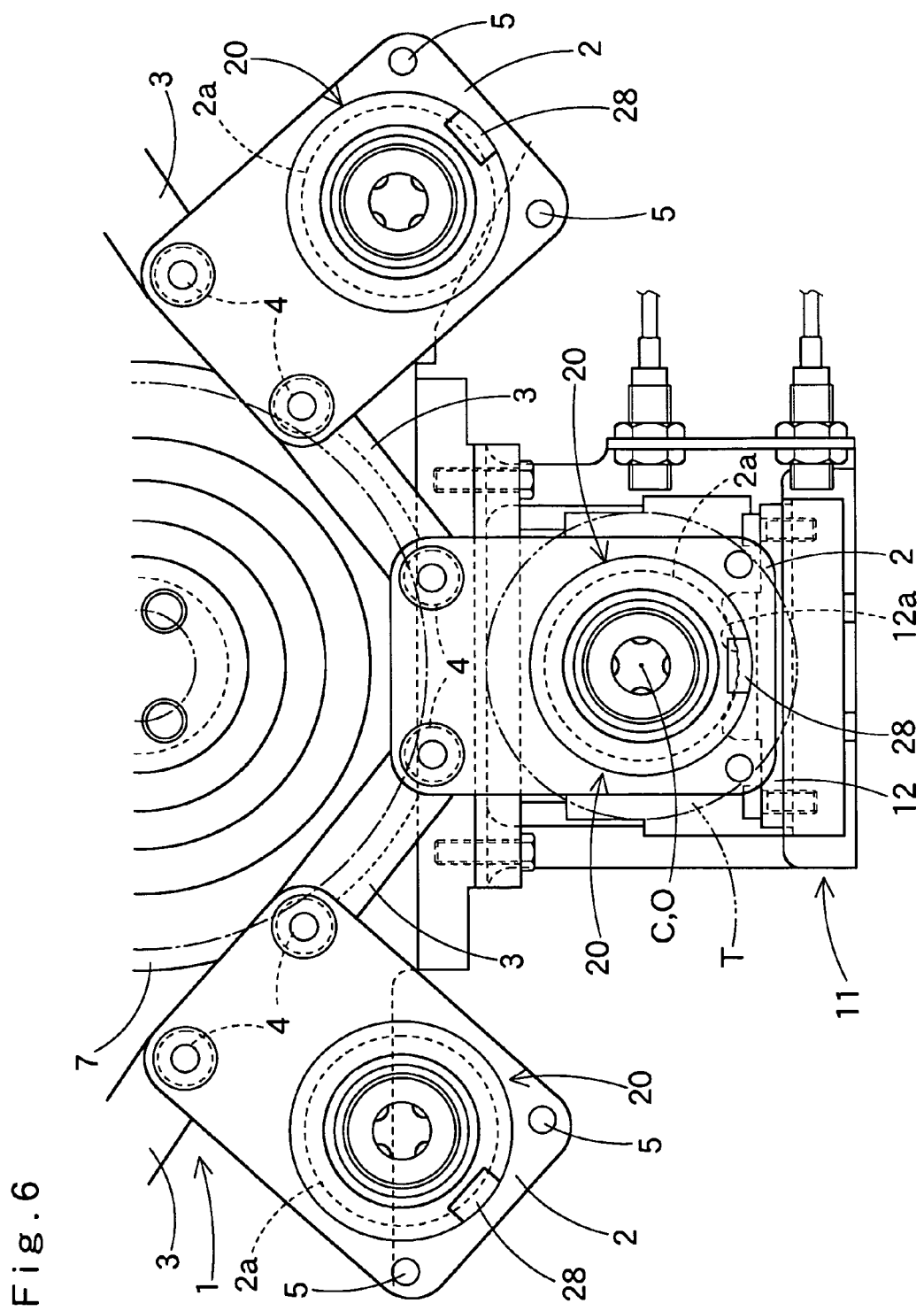
FIG. 6 is a schematic side view of the tool pot of FIG. 1 held by a holding mechanism and stopped by a positioning device.
Figure 7:
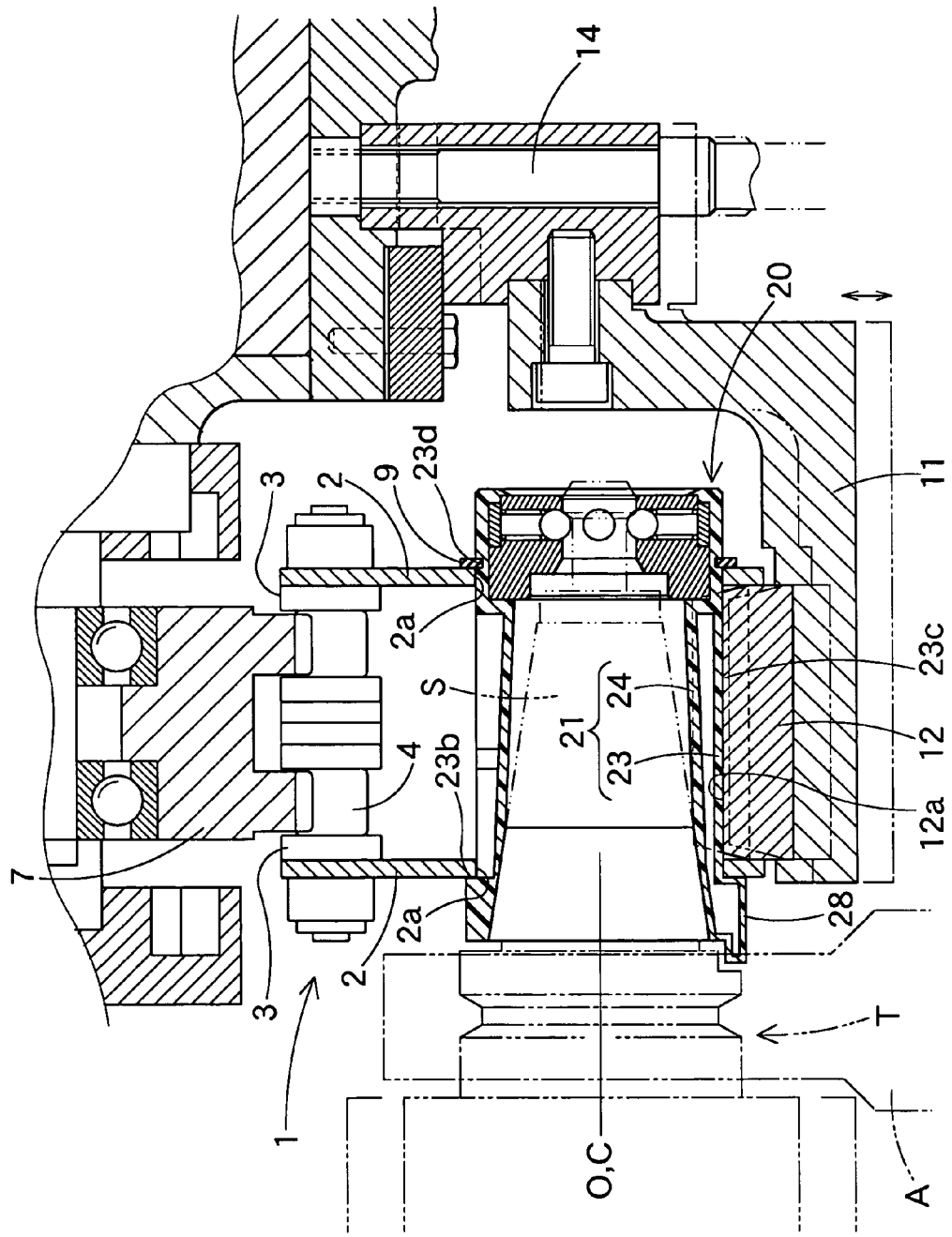
FIG. 7 is a schematic vertical section of the tool pot of FIG. 1 held by the holding mechanism and stopped by the positioning device.

FIGS. 1 to 5 illustrate a tool pot 20 according to a first embodiment of the invention. Numbers of tool pot 20 are held in a chain 1 as a pot holding mechanism of a tool magazine, as shown in FIGS. 6 and 7.

The chain 1 includes numbers of pairs of confronting outer plates 2 each connected by two rollers 4 engaged with a sprocket 7 and two tie rods 5, and inner plates 3 joining pairs of outer plates 2 that are adjacent one another in a direction perpendicular to an axis of the roller 4. The chain 1 is cyclically driven by the sprocket 7 and unillustrated driving or driven sprockets. Each of the outer plates 2 is provided with a mounting hole 2a for setting a tool pot 20 therein.

Below a track of the tool pots 20 transferred by cyclical driving of the chain 1 is a positioning device 11, on which an arm A of a robot takes out a tool pot 20 and returns a used tool pot 20. The positioning device 11 is linked with a piston rod 14 reciprocating vertically, and includes a positioning block 12 on top thereof. The positioning block 12 includes a positioning face 12a recessed in quarter arcuate shape corresponding to an outer side 23c of a circular cylindrical outer structure 23 of the tool pot 20.

Center O of curvature radius of the positioning face 12a as risen to uppermost position is called herein as base position O (refer to FIGS. 6, 7 and 8B) for the arm A of the robot to exchange tools T. Exchange of tools T is performed with the center C of the tool pot 20, which conforms with a center of a shank portion S of the tool T held by the tool pot 20, matched with the base position O. When the positioning face 12a descends to lowermost position, the positioning block 12 does not interfere with the tool pots 20 transferred by the chain 1.

As shown in FIGS. 1 to 5, each of the tool pots 20 has a tool attachment hole 22, and includes a cylindrical synthetic resin portion 21 molded from thermo-plastic resin. The synthetic resin portion 21 is arranged all over the length of the tool pot 20 from an opening end 21a to a tool gripping mechanism 29. In the first embodiment, the synthetic resin portion 21 is gas injection molded from polyamide (more particularly, Nylon 6).

The synthetic resin portion 21 includes an outer structure 23 defining outer shape, an inner structure 24 defining inner circumference, a cavity 27 provided between the outer structure 23 and the inner structure 24, and joint ribs 25 joining the outer structure 23 and the inner structure 24.

Each of the outer structure 23, the inner structure 24 and the joint ribs 25 has wall-thickness enough to retain rigidity including shape retention of the synthetic resin portion 21, and capable of suppressing mold shrinkage of the synthetic resin portion 21. In the first embodiment, average wall-thickness is predetermined within a range of 1.5 to 3.0 mm with partial exception of portions of 0.2 to 0.5 mm. Thickness of the inner structure 24 is predetermined within a range of 1.5 to 3.0 mm in entire area since its inner circumference serves as the tool attachment hole 22 requiring dimensional accuracy.

Figure 1:
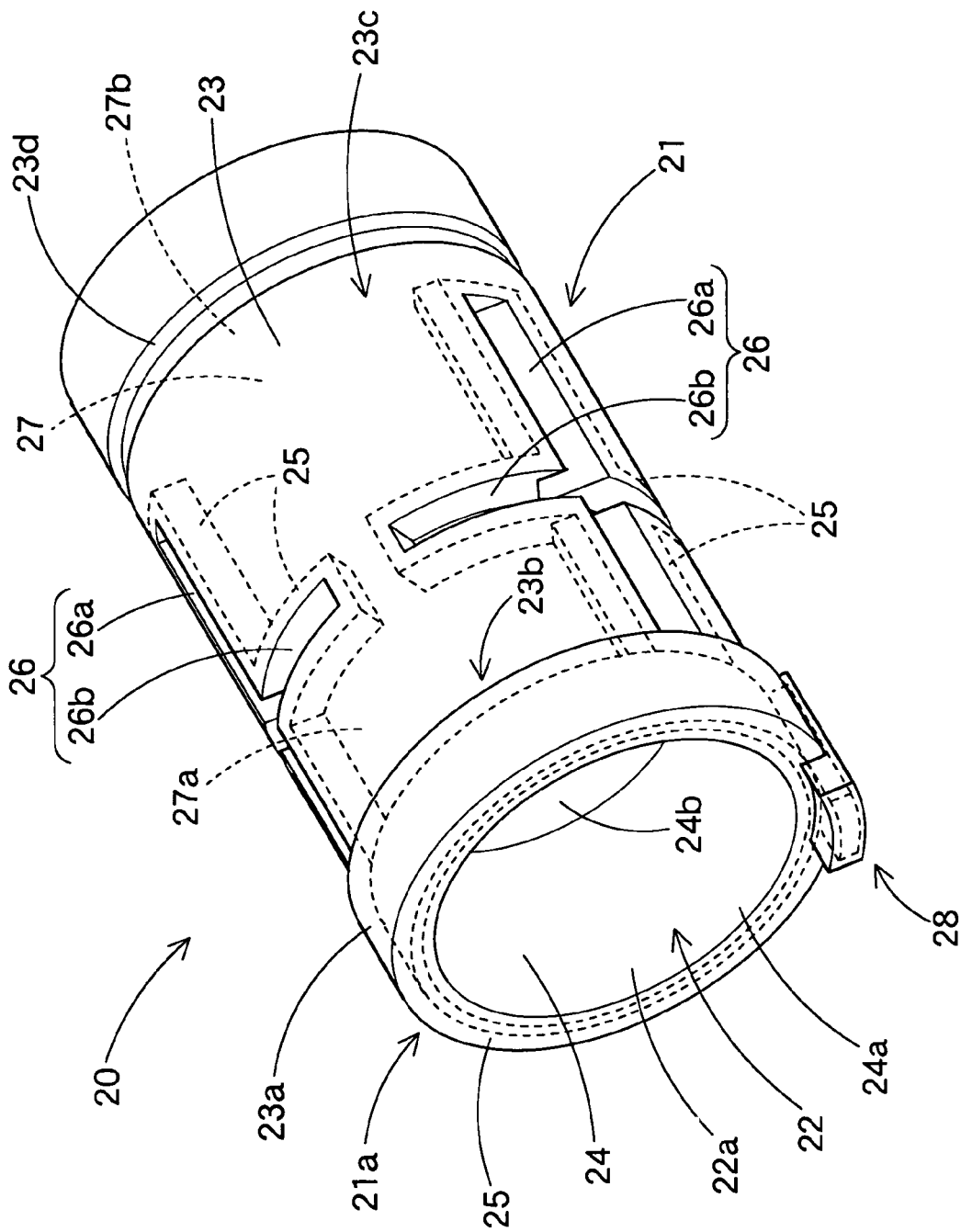
FIG. 1 is a perspective view of a tool pot according to a first embodiment of the present invention.
Figure 2:
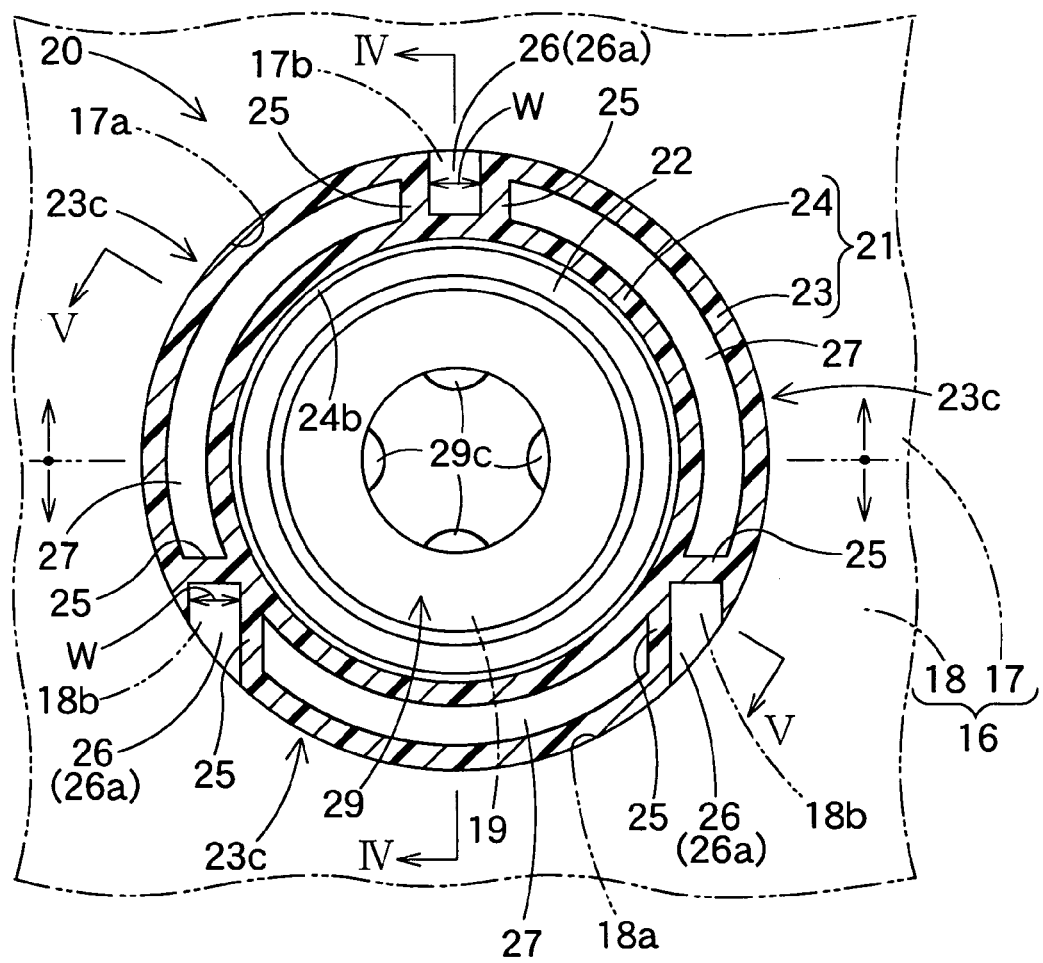
FIG. 2 is a vertical section of the tool pot of FIG. 1 taken along line II—II of FIG. 4.

The synthetic resin portion 21 further includes grooves 26 in outer circumference thereof that expose the inner structure 24 without the outer structure 23. In the first embodiment, each of the grooves 26 is formed into a cross shape by an axial groove 26a extending in axial direction of the attachment hole 22, and a circumferential groove 26b extending along circumference of the tool pot 20. The grooves 26 are arranged at regular intervals in the circumference of the synthetic resin portion 21. Side walls of the grooves 26 constitute the joint ribs 25 that join the outer structure 23 and the inner structure 24. In the illustrated embodiment, three grooves 26 are arranged at 120° intervals along the circumference of the tool pot 20, and width of each of the grooves 26 is about 5.0 mm, as shown in FIG. 2. The ribs 25 are arranged in an end face of the opening end 21a, too.

In the first embodiment, in all portions where no grooves 26 are arranged is the cavity 27 provided between the outer structure 23 and the inner structure 24. The cavity 27 is a single continuous space communicating the whole synthetic resin portion 21.

At side of the opening end 21a of the tool attachment hole 22 in the outer structure 23 is a cylindrical great diameter portion 23a that provides a step 23b. At bottom side of the tool attachment hole 22 is a groove 23d formed along an entire outer circumference of the tool gripping mechanism 29. As shown in FIG. 7, each of the tool pots 20 is put through the through holes 2a of the confronting outer plates 2 with the step 23b abutted against one of the outer plates 2 and with a holding ring 9 fitted in the groove 23d abutted against the other outer plate 2. Each of the tool pot 20 is thus held by the chain 1 as a pot holding mechanism.

In an end face of the great diameter portion 23a is a key projection 28 for positioning of tool T. The key projection 28 has a cavity 27 inside so as not to be thick-wall.

In the inner structure 24, inner surface of the tool attachment hole 2 near the opening end 21a diverges toward the opening end 21a, and forms a tapered supporting surface 24a for supporting a tool T. A deeper portion of the inner surface than the supporting surface 24a is a slant surface 24b narrowing toward the tool gripping mechanism 29. When a tool T is held in the tool pot 20, a shank portion S of the tool T abuts against the supporting surface 24a located near the opening end 21a, but does not abut against the slant surface 24b.

The tool gripping mechanism 29 is located at the bottom of the attachment hole 22 for holding the tool T by gripping a pull-stud P. The tool gripping mechanism 29 includes a metal block 29a and four balls 29c disposed inside the metal block 29a. Each of the balls 29c is constructed to move centrally of the attachment hole 22 by coil springs 29d, and the four balls 29c cooperatively grip the inserted pull-stud P of the tool T to hold the tool T with the shank portion S abutted against the supporting surface 24a of the inner structure 24. A member represented by reference numeral 29b is a holding ring for supporting an end of the coil spring 29d.

To manufacture the tool pot 20, the pre-molded tool gripping mechanism 29 is set in a mold for forming the synthetic resin portion 21 as an insert, the mold is closed, and then the synthetic resin portion 21 is gas-injection molded.

In the tool pot 20 of the first embodiment, the synthetic resin portion 21 includes the outer structure 23, the inner structure 24 and the joint ribs 25 joining the outer and inner structures 23 and 24, and thus has a double wall structure of the outer structure 23 and the inner structure 24 joined by the joint ribs 25. Accordingly, the synthetic resin portion 21 retains rigidity by reciprocal reinforcement of the individual parts even if each of the outer and inner structures 23 and 24 and the joint ribs 25 is thin-walled.

Since the outer and inner structures 23 and 24 and the joint ribs 25 are thin-walled, mold shrinkage is suppressed, which helps heighten dimensional accuracy. Since the key projection 28 is thin-walled by having the cavity 27 inside as well as the outer and inner structures 23 and 24 and the joint ribs 25, design in arrangement position or shape of the joint ribs 25, the key projection 28 and soon are easily changed. That is, design freedom of the synthetic resin portion 21 is heightened. Thick-walled portion is likely to cause mold shrinkage, and if there arises a portion having a greater volume than a cube of 4 mm by 4 mm by 4 mm in thermo-plastic resin such as Nylon 6, mold shrinkage occurs in such a portion, and dimensional accuracy is hardly retained.

In the first embodiment, moreover, damaging of tools T by the synthetic resin portion 21 is prevented, too, since rigidity of synthetic resin portion 21 is not retained by thermo-plastic resin material itself.

Therefore, the tool pot 20 in the first embodiment secures rigidity without damaging tools T by the synthetic resin portion 21, and also has high dimensional accuracy and design freedom.

Here, it is desired that upper limit of wall thickness of the outer and inner structures 23 and 24 and the joint ribs 25 is less than 4.0 mm, preferably 3.5 mm or less, and more preferably 3.0 mm or less in the light of suppressing mold shrinkage. Lower limit is desirably, partially, 0.2 mm or more, or more preferably 1.0 mm or more for securing rigidity of the synthetic resin portion 21. Average of wall thickness is desirably within a range of 1.5 to 3.0 mm.

Although Nylon 6 exemplifying polyamide is employed as thermo-plastic resin material in the first embodiment, other polyamide such as Nylon 66, ABS resin, polyacetal, polystyrene, or polycarbonate may also be employed.

In the first embodiment, furthermore, the synthetic resin portion 21 of the tool pot 20 including the outer structure 23, the inner structure 24 and the joint ribs 25 is integrally gas injection molded, which reduces cost, e.g., cost of mold, and processes for manufacturing the tool pot 20 in comparison with a case where each of the parts is separately injection molded.

Moreover, the tool pot 20 of the first embodiment includes the grooves 26 in outer circumference thereof that expose the inner structure 24, and side walls of the grooves 26 constitute the joint ribs 25 that join the outer structure 23 and the inner structure 24. The joint ribs 25 are easily and accurately arranged at predetermined positions by utilizing projected portions 17b and 18b (refer to double-dotted lines in FIGS. 3 and 4) of a mold 16 for forming the grooves 26, since the whole synthetic resin portion 21 is integrally injection molded.

Figure 3:
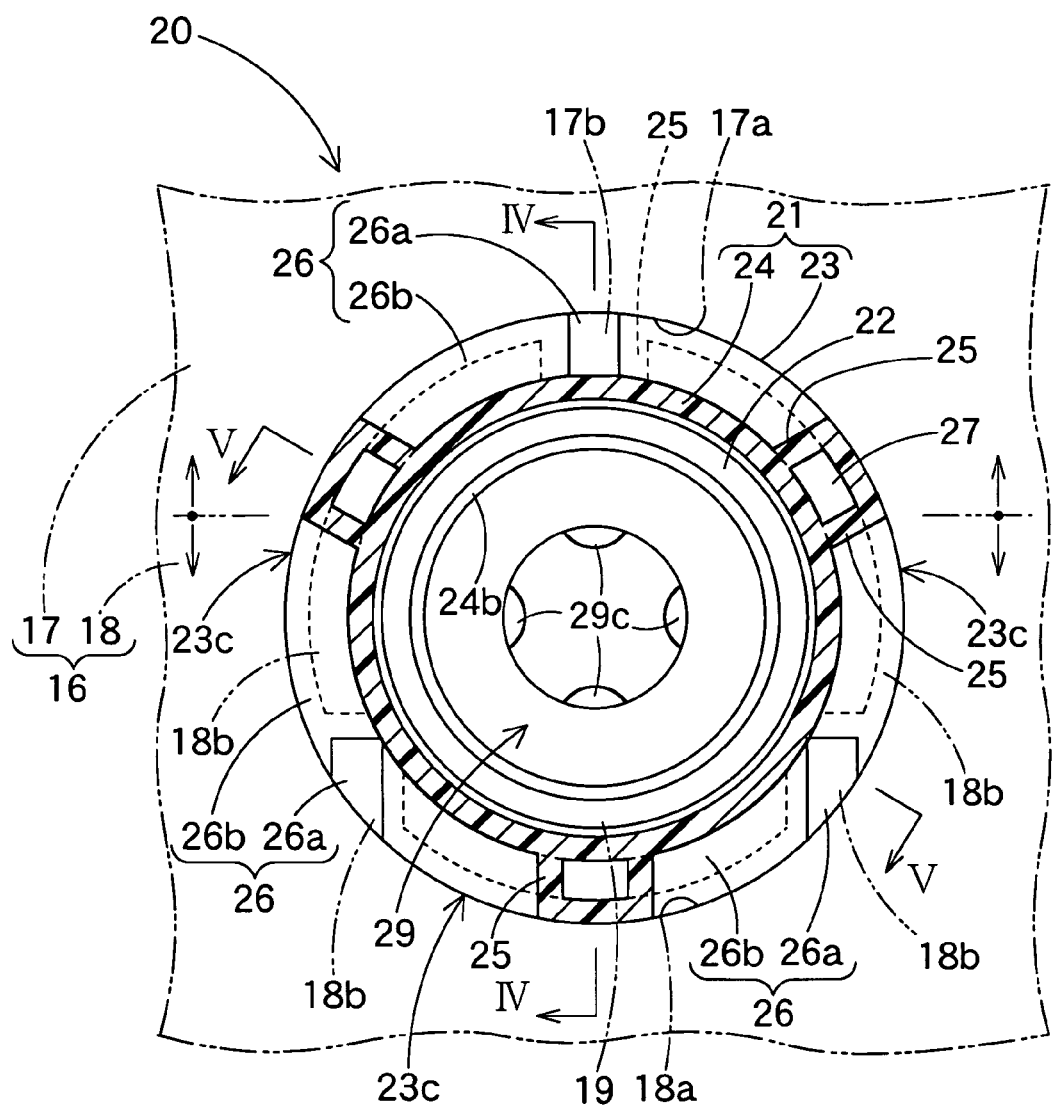
FIG. 3 is a vertical section of the tool pot of FIG. 1 taken along line III—III of FIG. 4.
Figure 4:
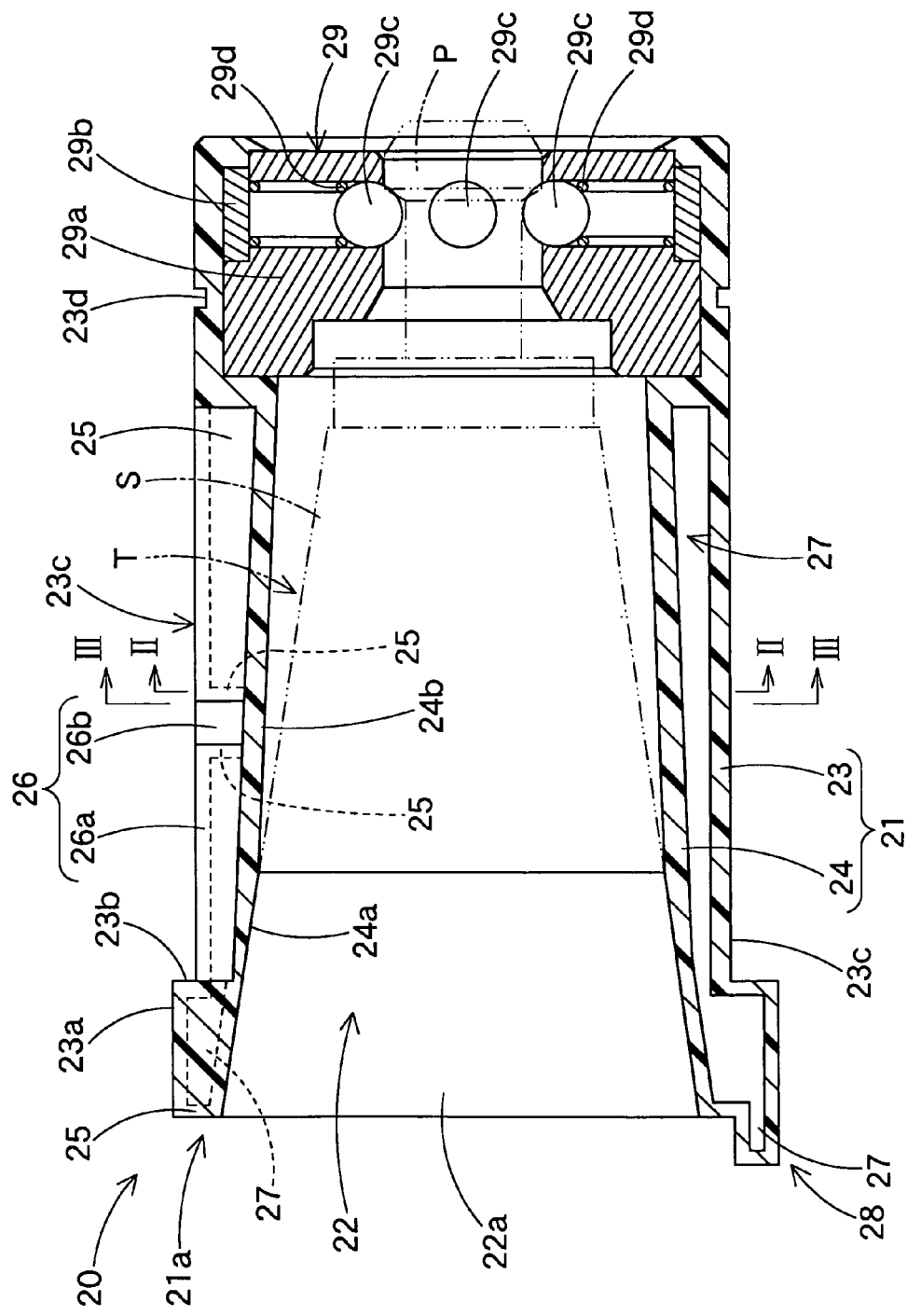
FIG. 4 is a vertical section of the tool pot of FIG. 1 taken along line IV—IV of FIGS. 2 and 3.
Figure 5:
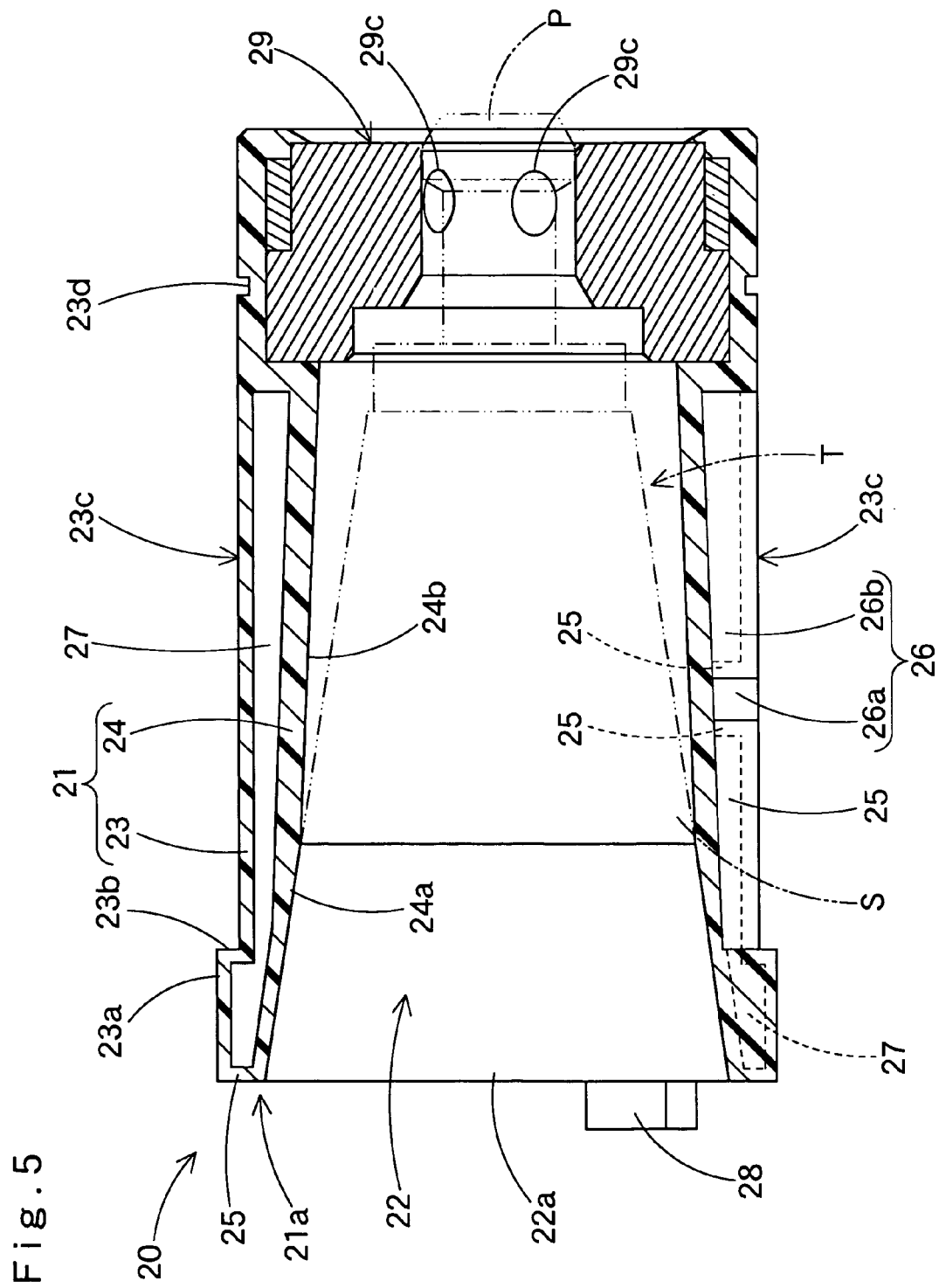
FIG. 5 is a vertical section of the tool pot of FIG. 1 taken along line V—V of FIGS. 2 and 3.

As indicated by double-dotted lines in FIGS. 3 and 4, the mold 16 used to mold the tool pot 20 of the first embodiment includes two split molds 17 and 18 for molding outer side of the synthetic resin portion 21, and a core 19 for molding inner surface of the tool attachment hole 22. Each of the split molds 17 and 18 is provided in its molding side 17a/18a with projections 17b/18b for forming the grooves 26. The mold 16 has three each of material injection ports and gas injection ports. The material injection ports are arranged in an axial end of the synthetic resin portion 21, and the gas injection ports are arranged in the other axial end, both in positions where no circumferential grooves 26b are arranged, and generally confront one another.

The tool pot 20 includes the circumferential grooves 26b, so that the grooves 26 are arranged intermittently along circumference of the tool pot 20, near the supporting surface 24a but away from the opening end 21a. With this construction, the outer structure 23 is split in axial direction of the attachment hole 22 at positions of the projections 17b and 18b of the mold 16 for forming the circumferential grooves 26b, and the split parts are further suppressed from mold shrinkage. Then dimensional accuracy over an entire length of the outer structure 23 is further heightened, which prevents dimensional inaccuracy from occurring in the inner structure 24. In addition, if the circumferential grooves 26b are arranged proximate to the supporting surface 24a, accuracy in angle and inner diameter of the supporting surface 24a is heightened, too. Furthermore, since the circumferential grooves 26b are arranged intermittently, portions 27a and 27b of the cavity 27 (refer to FIG. 1) arranged axially of the attachment hole 22 are so communicated in positions without the grooves 26b as to admit gas for gas injection molding, and therefore, there is no hindrance in molding the synthetic resin portion 21.

Here, if the gas injection ports of the mold for gas injection molding are located in both sides of the circumferential grooves 26b, the grooves 26b may be arranged all along the circumference of the tool pot 20. However, this construction is liable to complicate control of timing of injection of molten material and so on, and therefore, is not practical.

Moreover, the synthetic resin portion 21 includes more than one (3, in the first embodiment) axial grooves 26a arranged in axial direction of the attachment hole 22. Since each of the axial grooves 26a provides two joint ribs 25 in axial direction of the hole 22, the synthetic resin portion 21 comes to include more than 4 (6, in the first embodiment) joint ribs 25 axially of the attachment hole 22. Consequently, the outer structure 23 and the inner structure 24 are joined in numbers of positions, and rigidity of the outer and inner structures 23 and 24 are secured.

In order to reduce number of split molds of the mold 16 for gas injection molding of the tool pot 20, the axial grooves 26a are preferably arranged in 2 to 4 positions axially of the attachment hole 22.

If number of the axial grooves 26a is four or less, the grooves 26a provide therebetween continuous circumferential surfaces 23c each of which has at least about ¼ size of the circumference of the outer structure 23. Accordingly, the tool pot 20 of the first embodiment obtains following working-effects.

Figure 8A:
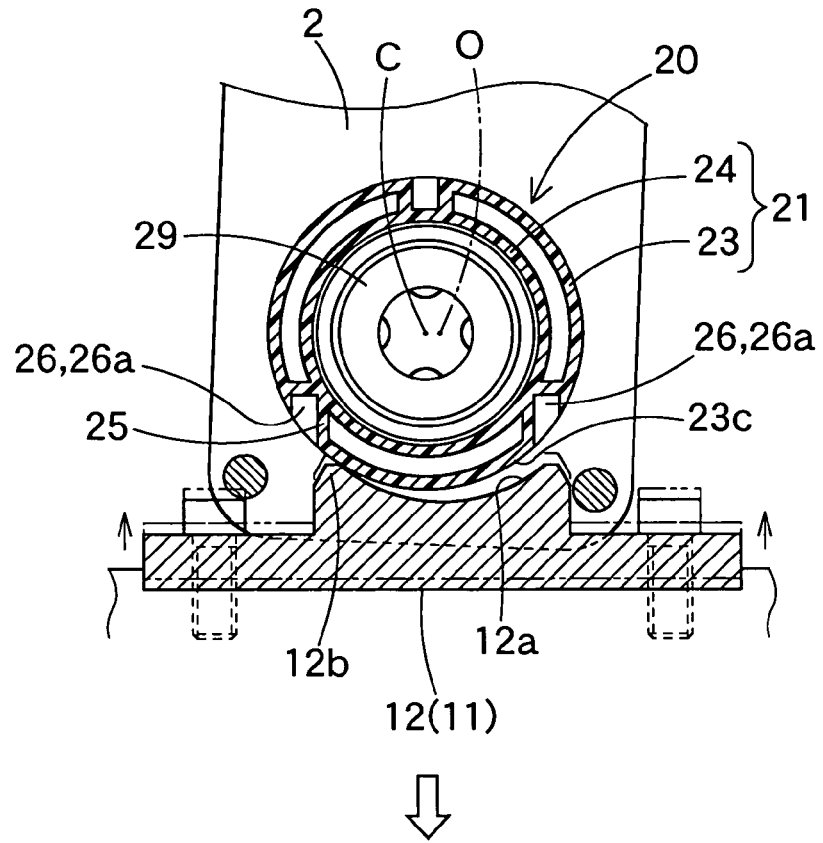
FIGS. 8A and 8B illustrate the tool pot of FIG. 1 being positioned by the positioning device in order.
Figure 8B:
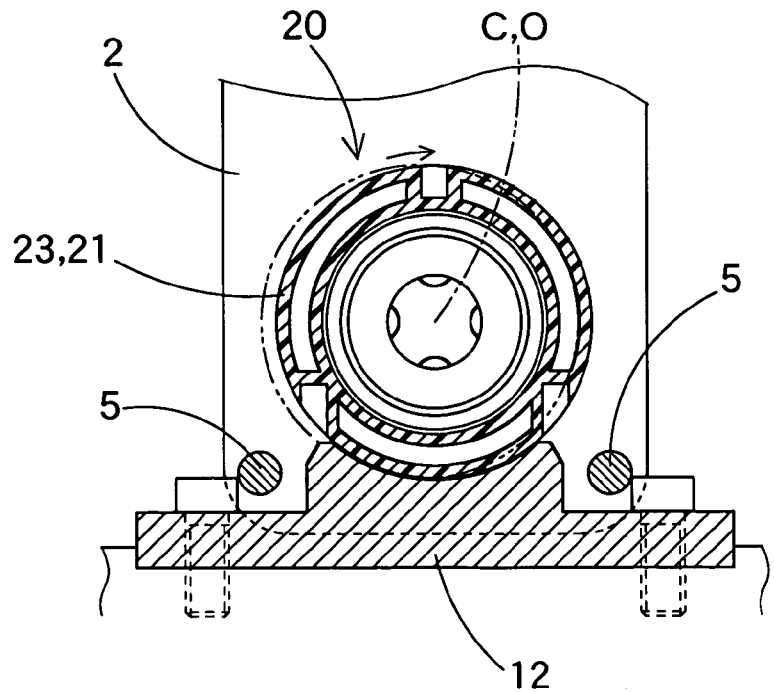

When the driving of the chain 1 as pot holding mechanism stops for exchanging tools T, center C of the tool pot 20 as stopped may not conform with an exchange base position O at first. In that case, when the positioning block 12 of the positioning device 11 ascends toward uppermost position, a part of the circumferential surface 23c of the outer structure 23 in the tool pot 20 contacts with the positioning face 12a firstly, as shown in FIG. 8A, and then the tool pot 20 is guided by the positioning face 12a along with ascent of the positioning face 12a, and matches the center C with the base position O, as shown in FIG. 8B. Here, it is plays or the like of the driving or driven sprockets 7 and the chain 1 that cause a gap between the center C and the base position O.

When the center C of the tool pot 20 and the base position O match each other, the tool pot 20 is ready for an arm A of a robot to take out a tool T from the tool pot 20 or return a used tool T to the tool pot 20.

Therefore, the tool pot 20 is located in a predetermined stop position O easily and accurately utilizing the circumferential surface 23c of the outer structure 23. In transfer of the tool pots 20 by the pot holding mechanism such as the chain 1, even if applying direction of the positioning face 12a of the positioning device 11 is somehow limited, the positioning face 12a can be applied to either one of the circumferential surfaces 23c arranged in between the axial grooves 26a and each of which has substantially ¼ size (substantially ⅓ size, in the first embodiment) of the circumference of the tool pot 20. This facilitates the positioning of the tool pot 20.

Contrarily, if the tool pot 20 has no outer structure 23 and is provided with reinforcing ribs formed outwardly from the inner structure 24, it would be difficult to locate a tool pot in a predetermined stop position O since the ribs are likely to get caught by an end portion 12b (refer to FIG. 8A) of the positioning block 12.

In consideration of above point, width W of each the axial grooves 26a is desirably narrow. The width W may be in a range of 1.0 to 20.0 mm, or more preferably in a range of 5.0 to 10.0 mm, on condition that rigidity of projections 17b and 18b of the mold 16 is secured.

Although the synthetic resin portion 21 is gas injection molded in the first embodiment, the synthetic resin portion may be formed by connecting separately molded outer structure and inner structure at least either one of which is provided with joint ribs, by high frequency welding, vibration welding, adhesive or the like. It will also be appreciated to connect separately molded joint ribs and outer and inner structures.

Figure 9:
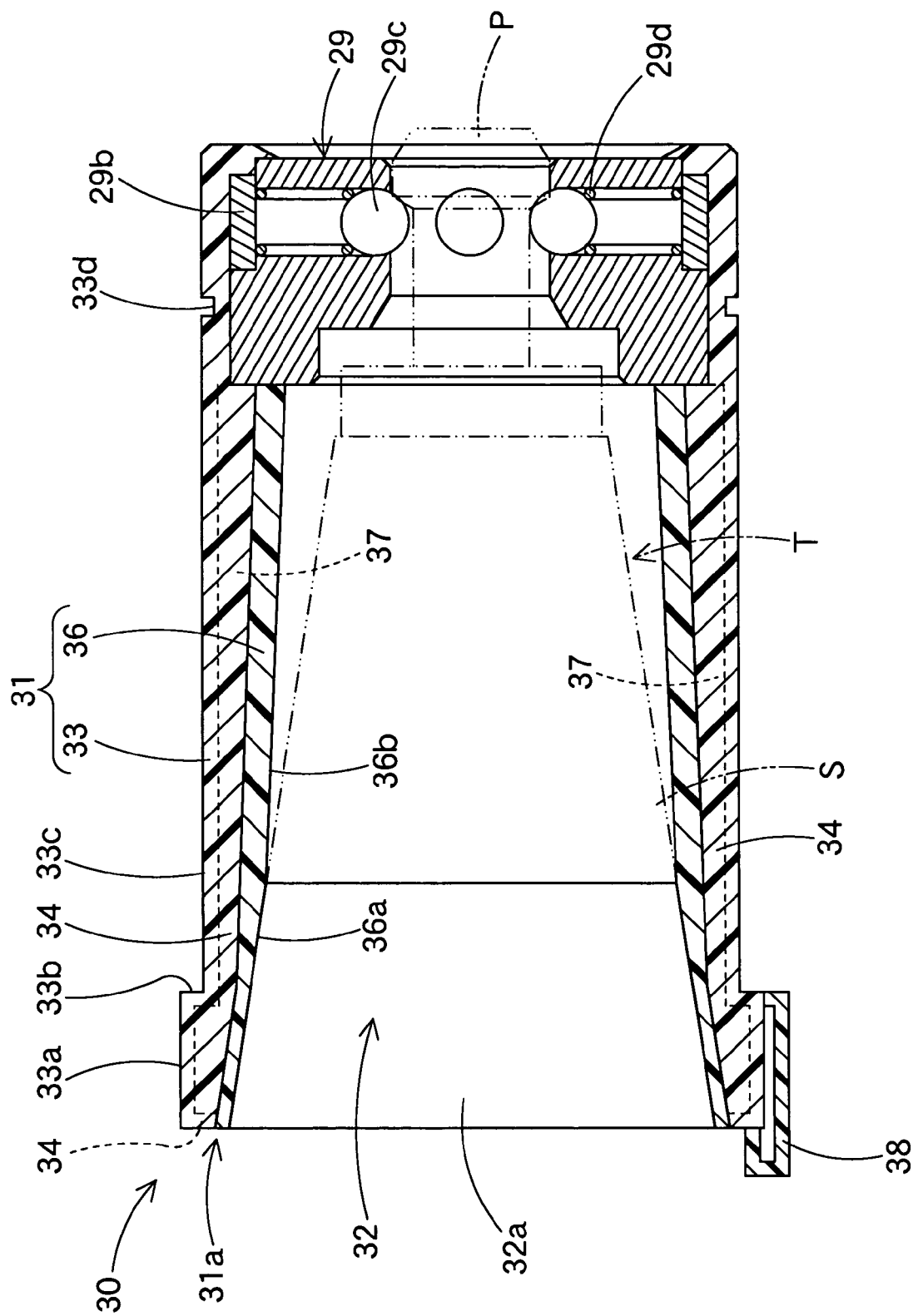
FIG. 9 is a vertical section of a tool pot according to a second embodiment of the present invention.
Figure 10:
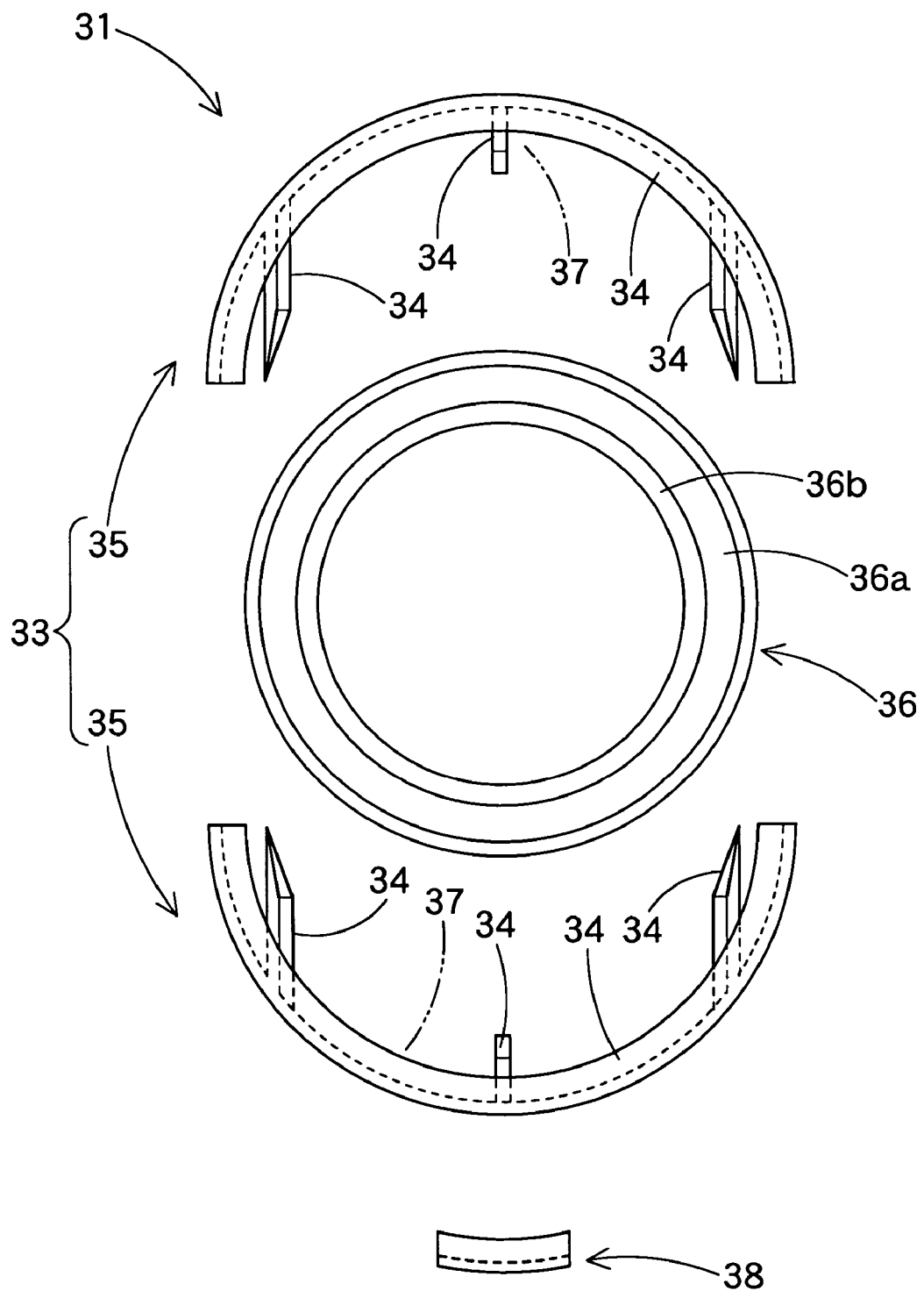
FIG. 10 is an exploded front view of a synthetic resin portion of the tool pot of FIG. 9.

FIGS. 9 to 11 illustrate a second embodiment of the tool pot according to the present invention. In this tool pot 30, a synthetic resin portion 31 includes an outer structure 33, an inner structure 36, and a key projection 38. The outer structure 33 includes joint ribs 34, and consists of two split parts 35 split in a parting face extending along axial direction of a tool attachment hole 32 and having the same shapes. The joint ribs 34 are formed in plurality (3, in the illustrated embodiment) in each of the split parts 35 for providing a cavity 37 between the outer and inner structures 33 and 36. Each of the split parts 35 is molded by two split molds located respectively in inner side and outer side of the outer structure 33.

In the inner structure 36, inner surface of the tool attachment hole 32 near an end 31a of opening 32a serves as a tapered supporting surface 36a for supporting shank portion S of a tool T. A deeper portion of the inner surface near a tool gripping portion 29 is a slant surface 36b which does not contact with the shank portion S.

Each of the split parts 35, the inner structure 36 and the key projection 38 is injection molded from thermo-plastic resin material such as Nylon 6, and the individual parts are joined by high frequency welding, vibration welding, adhesive or the like to form the synthetic resin portion 31. The tool pot 30 is manufactured by attaching the tool gripping portion 29 to the synthetic resin portion 31.

Of course, each of the split parts 35, the inner structure 36 and the key projection 38 has wall-thickness enough to secure rigidity and capable of suppressing mold shrinkage of the synthetic resin portion 31. More specifically, wall-thickness of these members is predetermined within a range of 1.5 to 3.0 mm.

The outer structure 33 includes a great diameter portion 33a that provides a step 33b and a groove 33d in which a holding ring 9 is fitted, as in the first embodiment. Thus the outer structure 33 is attached to outer plates 2 of the chain 1 as pot holding mechanism utilizing the holding ring 9.

In the tool pot 30 of the second embodiment, too, the synthetic resin portion 31 has a double wall structure of the outer and inner structures 33 and 36 joined by the joint ribs 34. Accordingly, the synthetic resin portion 31 retains rigidity by reciprocal reinforcement of the parts even if each of the outer and inner structures 33 and 36 and the joint ribs 34 is thin-walled. Since the outer and inner structures 33 and 36 and the joint ribs 34 are thin-walled, mold shrinkage is suppressed, which helps heighten dimensional accuracy of the synthetic resin portion 31. Thin wall-thicknesses of the outer and inner structures 33 and 36 and the joint ribs 34 also contributes to flexibility in change of arrangement portion of the key projection 28, for example. That is, design freedom of the synthetic resin portion 31 is heightened. Thick-walled portion is likely to cause mold shrinkage.

Moreover, damaging of tools T by the synthetic resin portion 31 is prevented, too, since rigidity of the synthetic resin portion 31 is not retained by thermo-plastic resin material itself. Therefore, the tool pot 30 in the second embodiment, too, secures rigidity without damaging a tool T by the synthetic resin portion 31, and also heightens dimensional accuracy and design freedom.

In the second embodiment, moreover, the tool pot 30 can be arranged to accommodate variety of tools only by exchanging the inner structure 36, where dimensional accuracy of the tool attachment hole 32 is required, while leaving the outer structure 33 as it is. Therefore, the tool pot 30 can handle various kinds of tools with simple exchanging work of the inner structure. In addition, by controlling wall-thickness of the inner structure 36, dimensional accuracy in angle and inner diameter of the supporting surface 36a of the tool attachment hole 32, and in length from the supporting surface 36a to the tool gripping portion 29 at the bottom of the hole 32 is secured, which helps ease management of dimensional accuracy of the outer structure 33, and facilitates manufacturing of the outer structure 33.

Figure 11A:
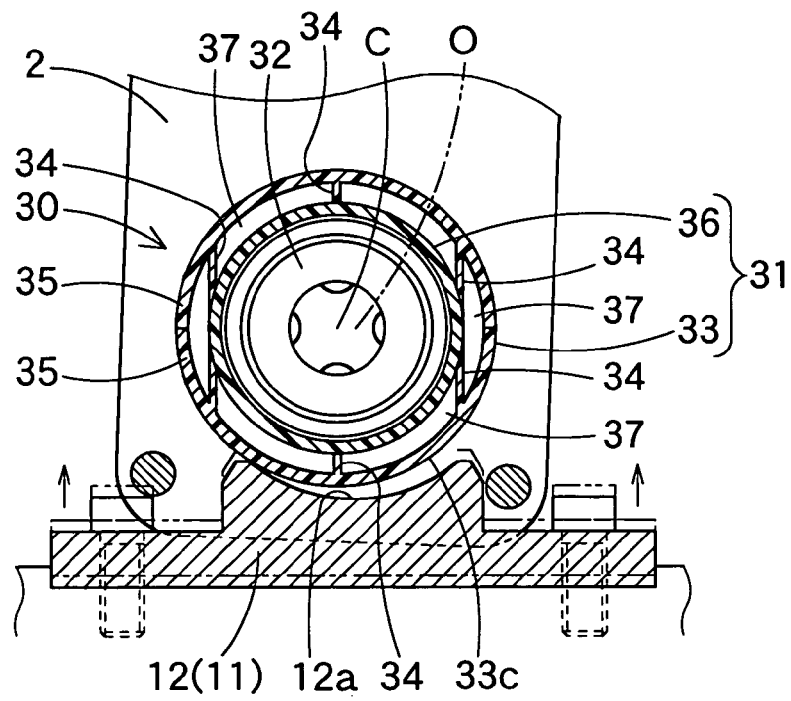
FIGS. 11A and 11B illustrate the tool pot of FIG. 9 being positioned by the positioning device in order.
Figure 11B:
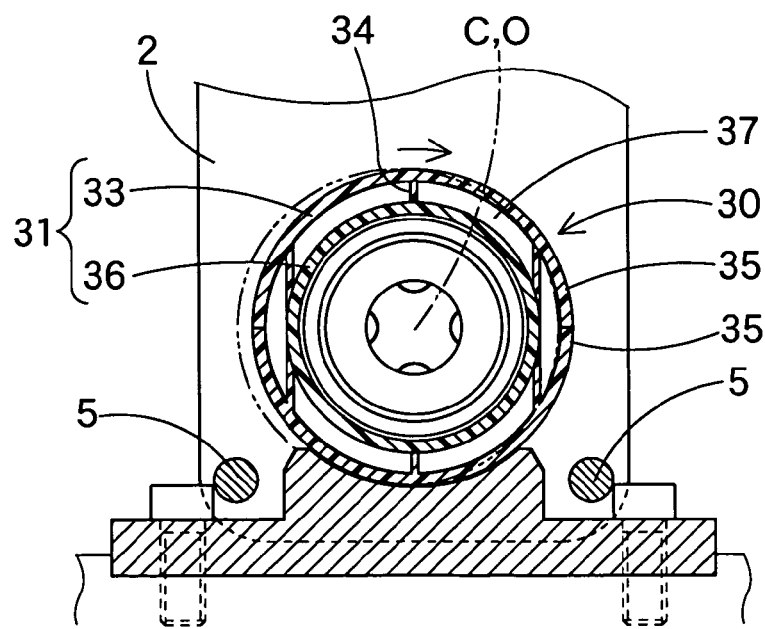

In the second embodiment, moreover, outer surface of the tool pot 30 provides a circumferential surface 33c that is circular cylindrical over an entire length from the step 33b to the groove 33d of the outer structure 33, and over an entire circumferential direction of the tool attachment hole 32. Accordingly, in occasions of exchanging tools T and so on, if the positioning face 12a of the positioning device 11, which is so arcuate to correspond to the circumferential surface 33c, is applied to the tool pot 30, as shown in FIGS. 11A and 11B, the tool pot 30 is moved to conform with the center O of the positioning face 12a, and positioned accurately. In the second embodiment, furthermore, even if applying direction of the positioning face 12a is somehow limited, the tool pot 30 is positioned smoothly since the positioning face 12a can be applied to the cylindrical surface 33c arranged over the entire circumference of the tool pot 30 from any circumferential direction of the tool pot 30.

Figure 12:
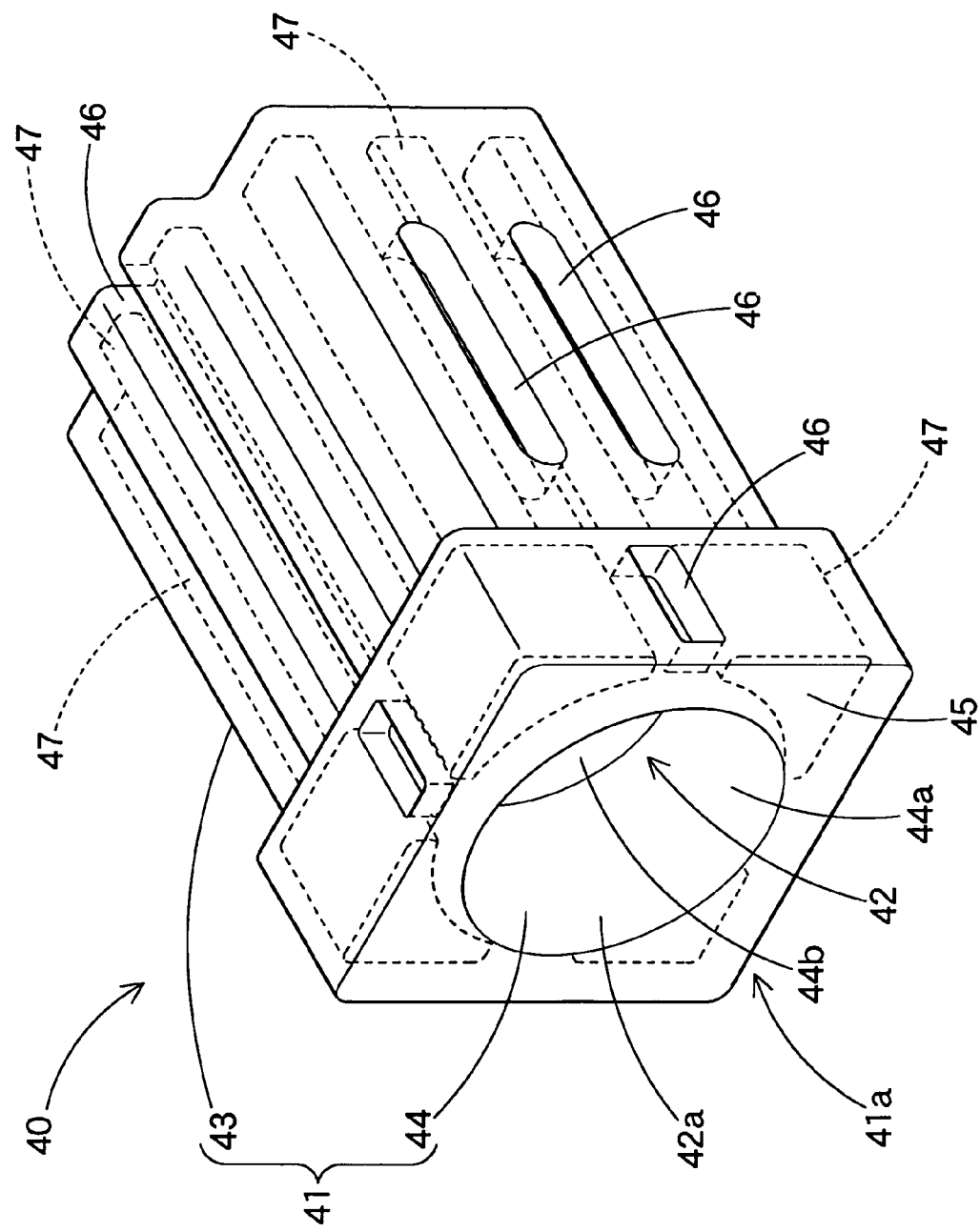
FIG. 12 is a perspective view of a tool pot according to a third embodiment of the present invention.
Figure 13:
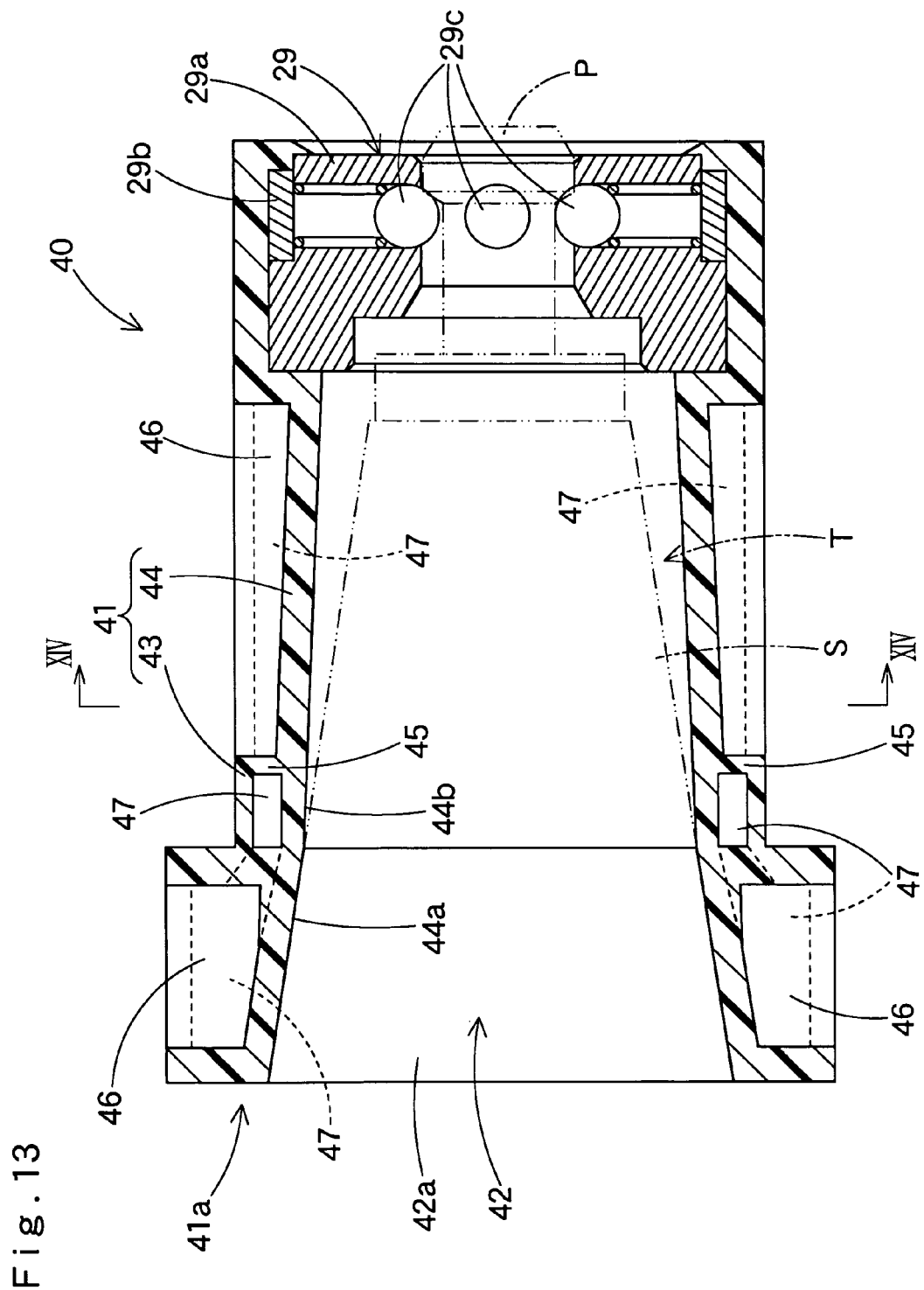
FIG. 13 is a vertical section of the tool pot of FIG. 12 taken along line XIII—XIII of FIG. 14.
Figure 14:
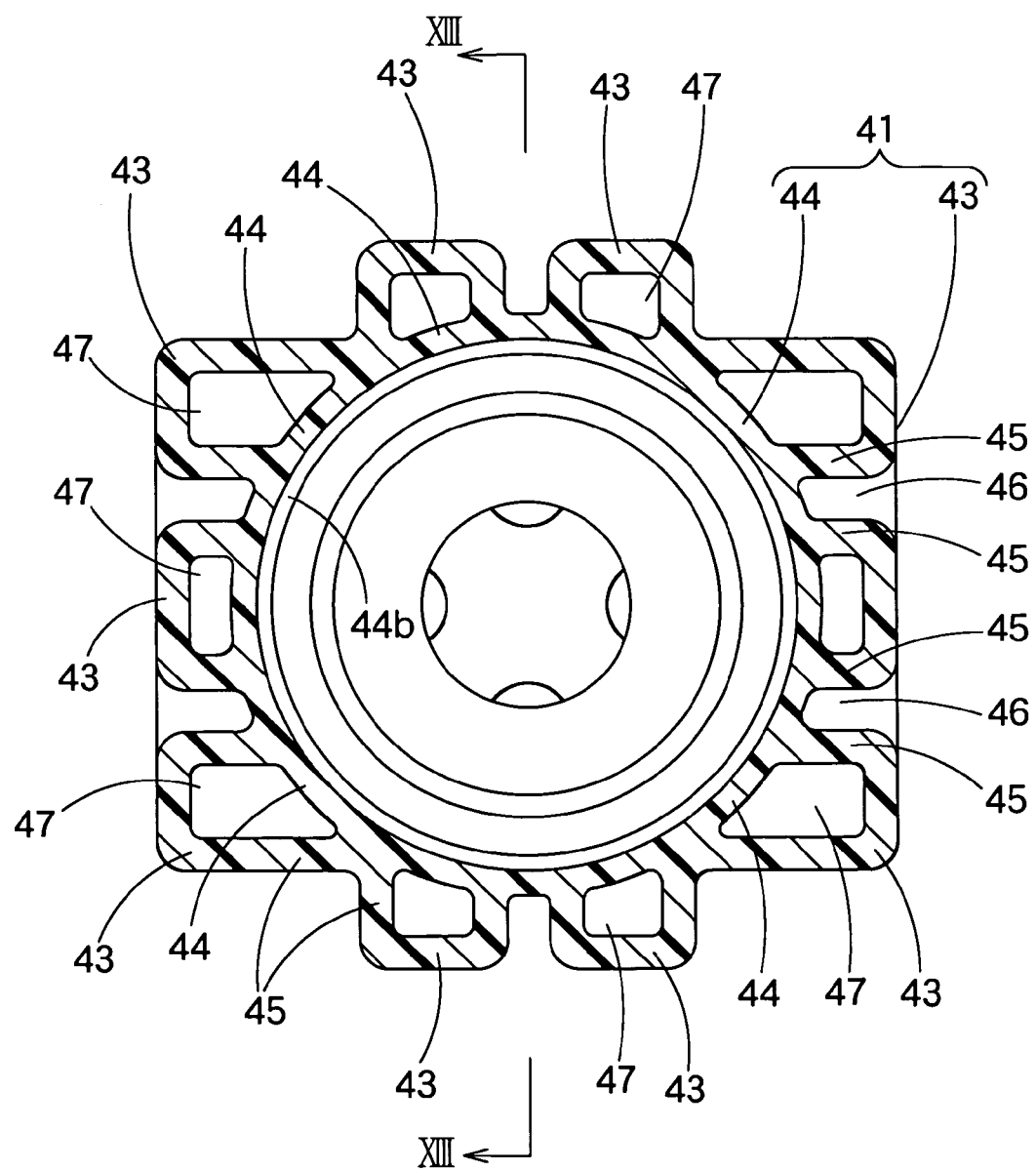
FIG. 14 is a vertical section of the tool pot of FIG. 12 taken along line XIV—XIV of FIG. 13.

Although the outer structures 23 and 33 in the first and second embodiments have substantially circular cylindrical shapes, the outer structure may be formed substantially square cylindrical in outer shape, as a tool pot 40 shown in FIGS. 12 to 14, which is a third embodiment of the present invention. A synthetic resin portion 41 of the tool pot 40 is gas injection molded.

The synthetic resin portion 41 includes an outer structure 43 defining outer shape, an inner structure 44 defining inner circumference of a tool attachment hole 42, a cavity 47 provided between the outer structure 43 and the inner structure 44, and joint ribs 45 joining the outer structure 43 and the inner structure 44. In the inner structure 44, inner surface of the tool attachment hole 42 near an end 41a of opening 42a serves as a tapered supporting surface 44a for supporting a shank portion S of a tool T. A deeper portion of the inner surface near a tool gripping portion 29 is a slant surface 44b which does not contact with the shank portion S.

Each of the outer structure 43, the inner structure 44 and the joint ribs 45 has wall-thickness enough to secure rigidity and capable of suppressing mold shrinkage of the synthetic resin portion 41, as in the first embodiment.

The joint ribs 45 are formed by side walls of grooves 46 that are formed to expose the inner structure 44 to outside.

A plurality of the grooves 46 are arranged along circumferential direction of the attachment hole 42, and each of the grooves 46 extends axially of the tool attachment hole 42. The ribs 45 are arranged in an end face of the opening end 41a of the synthetic resin portion 41, too.

Although the tool pot 40 in the third embodiment differs from the first embodiment in that the outer structure 43 is formed in substantially square cylindrical shape and in that the grooves 46 extend axially of the attachment hole 42, other constructions are substantially the same as in the first embodiment, and therefore, the third embodiment attains substantially the same working-effects as the first embodiment.

Polygonal cylindrical shape of the outer structure 43 may be applied to a tool pot which is manufactured by joining separately injection molded parts as the second embodiment.

Figure 15:
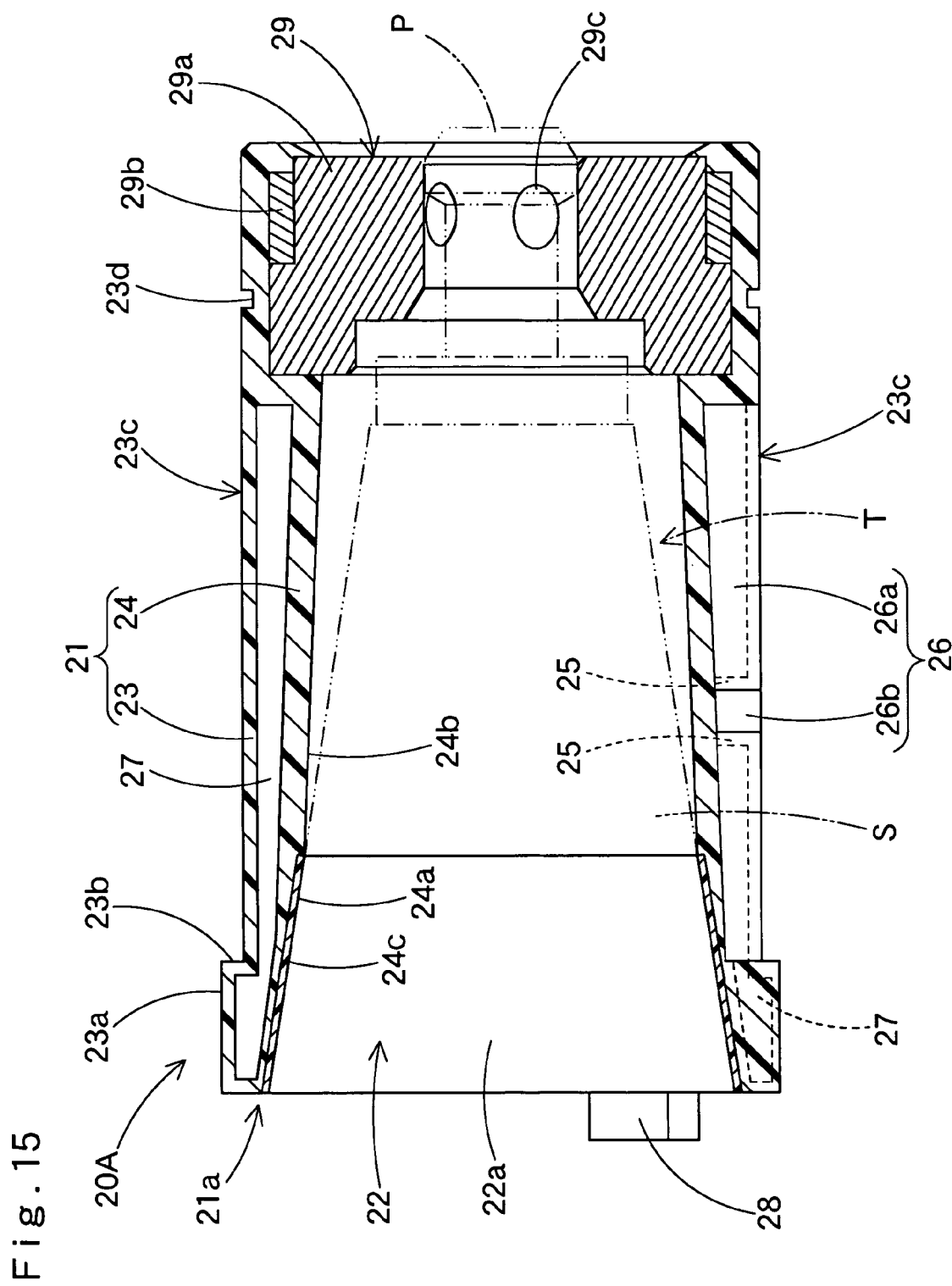
FIG. 15 is a vertical section of a modification of the tool pot of FIG. 1.
Figure 16:
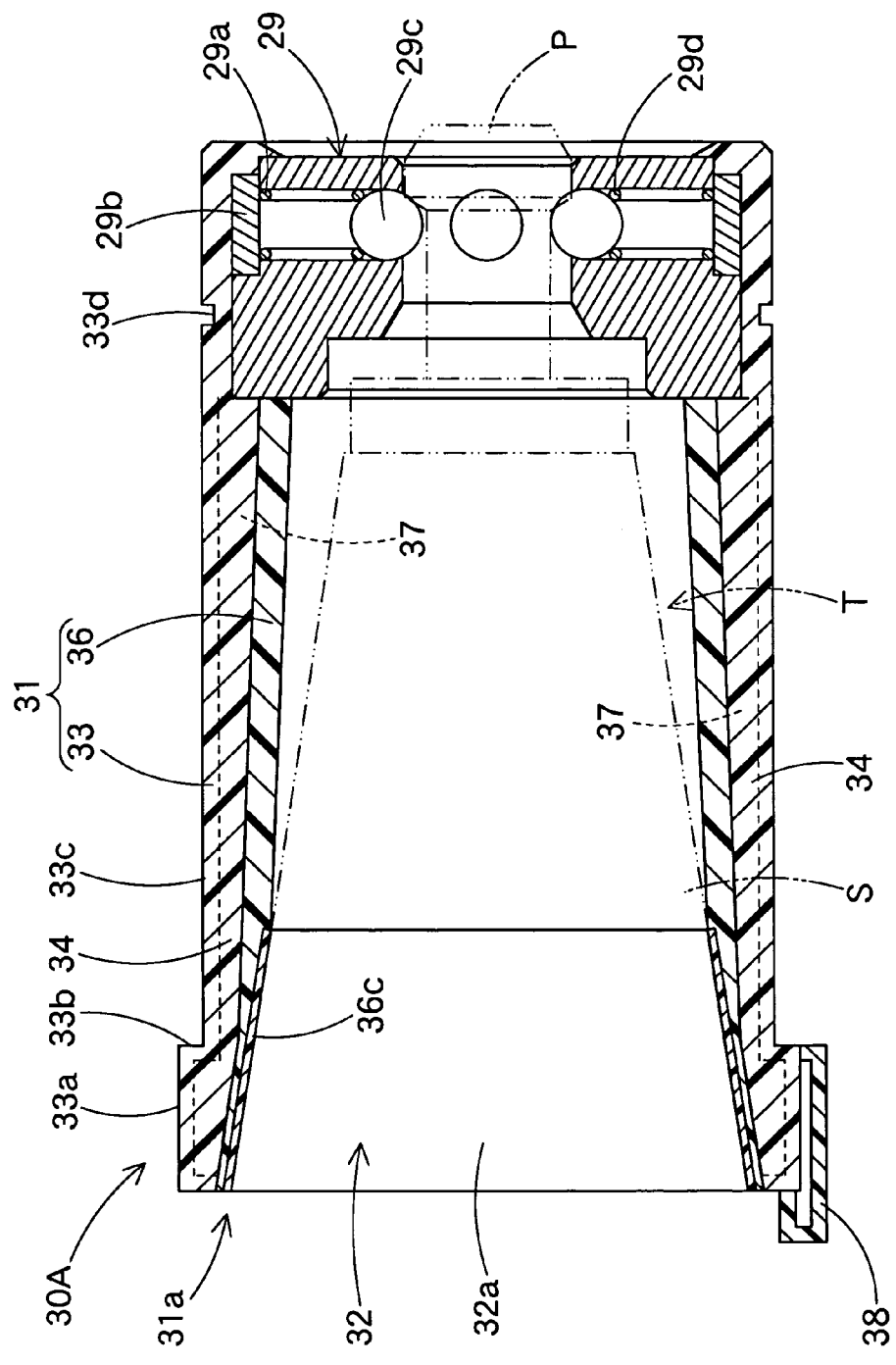
FIG. 16 is a vertical section of a modification of the tool pot of FIG. 9.

Each of FIGS. 15 and 16 illustrates a tool pot 20A/30A which is a modification of the first/second embodiment. In the inner structure 24/26 of synthetic resin portion 21/31 of the tool pot 20A/30A, at least a portion 24c/36c constituting supporting surfaces 24a/36a located near an opening end 21a/31a is molded from less rigid material than in an outer structure 23/33 so that the synthetic resin portion 21/31 may not damage tools T.

If the synthetic resin portion 21/31 is made from thermo-plastic resin material such as Nylon 6, for example, the rigidity of the portion 24c/36c is lowered by mixing 0 weight % of glass fiber as reinforcing filler into its material while other portions of the synthetic resin portion 21/31 is molded from material containing 29 weight % of glass fiber, for example. Here, if content of glass fiber is less than 5 weight %, damaging of tools T is securely prevented, and if content of glass fiber is within a range of 5 to 60 weight %, rigidity is stably assured.

Moreover, the tool pot 20A shown in FIG. 15 is manufactured easily by setting the portion 24c as an insert in a mold for gas injection molding the synthetic resin portion 21. The tool pot 30A shown in FIG. 16 is also manufactured by setting the portion 36c as an insert in a mold for molding the inner structure 36.

In addition, the portion 24c/36c may be arranged over an entire length of the inner structure 24/36.

What is claimed is:

1. A tool pot comprising a tool attachment hole into which a tool is inserted and a tool gripping portion located in deeper side of the attachment hole, an inner surface of the attachment hole close to an opening end of the attachment hole being diverged toward the opening end and serving as a supporting surface for supporting a tool, wherein:
    the tool pot includes a cylindrical synthetic resin portion made from thermo-plastic resin and arranged over an entire length of the tool attachment hole from the opening end to the tool gripping portion;
    the synthetic resin portion includes an outer structure defining outer shape, an inner structure defining inner circumference of the tool attachment hole, a cavity provided between the outer structure and the inner structure, and joint ribs joining the outer structure and the inner structure; and
    each of the outer structure, the inner structure and the joint ribs has wall-thickness enough to secure rigidity of the synthetic resin portion and capable of suppressing mold shrinkage of the synthetic resin portion.

2. The tool pot according to claim 1, wherein upper limit of wall thickness of the outer and inner structures and the joint ribs is less than 4.0 mm, lower limit is 0.2 mm or more, and average of wall thickness is within a range of 1.5 to 3.0 mm.

3. The tool pot according to claim 1, wherein the synthetic resin portion including the outer structure, inner structure and joint ribs is integrally gas injection molded.

4. The tool pot according to claim 3, wherein:
    the tool pot includes a groove in outer circumference thereof that exposes the inner structure to outside without the outer structure; and
    side walls of the groove constitute the joint ribs.

5. The tool pot according to claim 4, wherein a plurality of the grooves are arranged intermittently along circumference of the tool pot, in the vicinity of the supporting surface but away from the opening end part of the supporting surface.

6. The tool pot according to claim 4, wherein a plurality of the grooves are arranged along circumference of the tool pot, and each of the grooves extends in axial direction of the tool attachment hole.

7. The tool pot according to claim 6, wherein:
    two to four of the grooves extending along axial direction of the tool attachment hole are arranged along circumference of the tool pot; and
    width of each of the grooves is within a range of 1.0 to 20.0 mm;
    whereby a circumferential surface having at least generally ¼ size of the circumference of the outer structure is provided between each of the grooves.

8. The tool pot according to claim 1, wherein the synthetic resin portion is manufactured by joining the outer structure and inner structure at least either one of which is provided with the joint ribs, or by joining the outer structure, inner structure and separately molded joint ribs.

9. The tool pot according to claim 8, wherein the synthetic resin portion has an outer surface which is circular cylindrical over an entire circumference of the tool pot.

10. The tool pot according to claim 8, wherein the outer structure consists of two split parts split in a parting face extending along axial direction of the tool attachment hole and having the same shapes, and each of the split parts includes the joint ribs.

* * * * *